US012747767B2

(12) United States Patent
Badino et al.

(10) Patent No.: US 12,747,767 B2
(45) Date of Patent: Sep. 29, 2026

(54) BRAKING PAD FOR VEHICLES, AND ASSEMBLING METHOD FOR MAKING SUCH A BRAKING PAD

(71) Applicant: STELLANTIS EUROPE S.P.A., Turin (IT)

(72) Inventors: Renato Badino, Turin (IT); Michele Ieluzzi, Turin (IT); Silvano Sandri, Turin (IT); Alessandro Beccheri, Turin (IT); Oreste Bertini, Turin (IT)

(73) Assignee: STELLANTIS EUROPE S.P.A., Turin (IT)

( * ) Notice: Subject to any disclaimer, the term of this patent is extended or adjusted under 35 U.S.C. 154(b) by 0 days.

(21) Appl. No.: 18/858,835

(22) PCT Filed: Apr. 24, 2023

(86) PCT No.: PCT/IB2023/054187
§ 371 (c)(1),
(2) Date: Oct. 22, 2024

(87) PCT Pub. No.: WO2023/209539
PCT Pub. Date: Nov. 2, 2023

(65) Prior Publication Data

US 2025/0290551 A1 Sep. 18, 2025

(30) Foreign Application Priority Data

Apr. 28, 2022 (IT) ........................ 102022000008510

(51) Int. Cl.
*F16D 66/02* (2006.01)
*F16D 65/092* (2006.01)

(52) U.S. Cl.
CPC ......... *F16D 66/021* (2013.01); *F16D 65/092* (2013.01); *F16D 2250/0084* (2013.01)

(58) Field of Classification Search
CPC ................. F16D 66/021; F16D 65/092; F16D 2250/0084; F16D 66/00; F16D 66/024
See application file for complete search history.

(56) References Cited

U.S. PATENT DOCUMENTS 6,065,359 A 5/2000 Takanashi et al.
6,302,241 B1 * 10/2001 Gronowicz, Jr. ..... B60T 17/221 188/1.11 W (Continued)

FOREIGN PATENT DOCUMENTS

DE 102018105057 A1 9/2019
EP 0273801 B1 2/1991
JP H10252791 A 9/1998

OTHER PUBLICATIONS

International Search Report and Written Opinion of the ISA issued in PCT/IB2023/054187, mailed Jul. 25, 2023; ISA/EP.

*Primary Examiner* — Curtis J King
(74) *Attorney, Agent, or Firm* — Harness, Dickey & Pierce, P.L.C.

(57) ABSTRACT

A braking pad for vehicles has a backplate suitable for connection to a braking member and supports, on a first face, a block of friction material; the braking pad, in addition, has a sensor provided with a detection head engaging a hole in the backplate and is retained in a reference position fixed by a plate retention member; such an element is directly coupled to the backplate via engagement portions and has an annular portion provided with an inner edge, which is coaxial to the above-mentioned hole and is coupled to the sensor detection head via friction and/or via interference coupling and/or via snap coupling.

10 Claims, 3 Drawing Sheets

(56) References Cited

U.S. PATENT DOCUMENTS 8,544,614 B1 * 10/2013 Plantan ................. F16D 65/095 188/73.31
9,353,815 B1 * 5/2016 Eden ..................... F16D 66/024
12,005,939 B2 * 6/2024 Sommerhalter, Jr. .. H02K 41/02
12,509,047 B2 * 12/2025 Shin ...................... B60T 13/746
2003/0083797 A1 * 5/2003 Yokoyama ............ F16D 55/226 303/20
2004/0026989 A1 * 2/2004 Suzuki .................. B60T 13/741 303/20
2006/0027426 A1 * 2/2006 Roszman .............. F16D 65/092 188/71.1
2007/0062764 A1 * 3/2007 Takahashi ............... F16D 65/18 188/1.11 R
2008/0190712 A1 * 8/2008 Hagberg ............... F16D 65/092 188/250 R
2009/0055065 A1 * 2/2009 Dessouki .............. B60T 17/221 188/218 R
2009/0211857 A1 * 8/2009 Camilo-Martinez ........................ F16D 65/0978 188/250 B
2010/0065389 A1 * 3/2010 Gilboy .................. F16D 65/092 29/428
2011/0133923 A1 * 6/2011 Evans ................... B60T 17/221 340/454
2013/0299289 A1 * 11/2013 Eichler ................. F16D 65/092 324/699
2014/0311833 A1 * 10/2014 Martinotto ............ F16D 65/092 29/25.35
2016/0305502 A1 * 10/2016 Eden ..................... F16D 66/024
2016/0363182 A1 * 12/2016 Eden ..................... F16D 66/028
2017/0234383 A1 * 8/2017 Merlo ..................... F16D 69/00 188/250 B
2017/0234384 A1 * 8/2017 Sabeti ................... F16D 65/095 188/73.1
2018/0031066 A1 * 2/2018 Lin ........................ F16D 66/024
2018/0306256 A1 * 10/2018 Evans, Jr. ............. F16D 66/023
2019/0128352 A1 * 5/2019 Jain ....................... F16D 66/027
2019/0193693 A1 * 6/2019 Steele ..................... F16D 65/18
2019/0225202 A1 * 7/2019 Juzswik .................. F16D 65/14
2019/0264764 A1 * 8/2019 Lin ........................ F16D 66/027
2019/0264765 A1 * 8/2019 Juzswik ............... G01B 5/0028
2019/0293137 A1 * 9/2019 Mohseni ............... F16D 66/027
2019/0351889 A1 * 11/2019 Serra ....................... F16D 66/00
2019/0368562 A1 * 12/2019 Hong .................... F16D 66/027
2021/0088094 A1 * 3/2021 Kane ........................ B60T 17/22
2021/0139275 A1 * 5/2021 Koskinen .............. B66B 1/3476
2021/0197777 A1 * 7/2021 Itakura .................. B60T 13/746
2022/0001845 A1 * 1/2022 Itakura .................... F16D 66/00
2022/0073049 A1 * 3/2022 Beier ......................... H02P 6/28
2022/0243778 A1 * 8/2022 Heeder ................. F16D 66/027
2023/0037259 A1 * 2/2023 Meggiolan .............. B62L 3/023
2023/0096418 A1 * 3/2023 Ganzel .................. B60T 13/148 188/71.8
2023/0265902 A1 * 8/2023 Sakhare ................... G01K 1/14 188/1.11 L
2023/0358287 A1 * 11/2023 Boncha ................... F16D 66/00
2023/0383805 A1 * 11/2023 Gee ....................... F16D 66/027
2023/0392660 A1 * 12/2023 Chidambaram ........ B60T 8/321
2024/0288042 A1 * 8/2024 Savage ............... F16D 69/0408
2025/0052290 A1 * 2/2025 Barale .................... H05B 6/102
2025/0067312 A1 * 2/2025 Casadio ................ B60T 13/741
2025/0084906 A1 * 3/2025 Terranova ............. F16D 65/095

* cited by examiner

FIG. 1
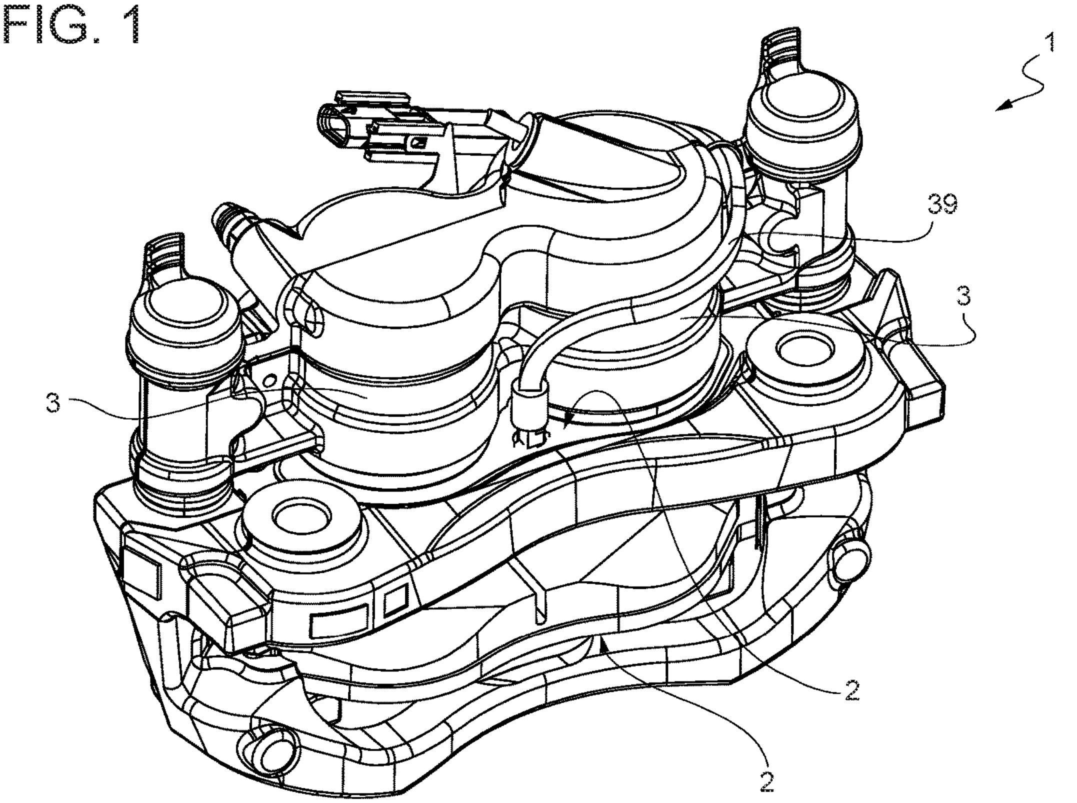
FIG. 3
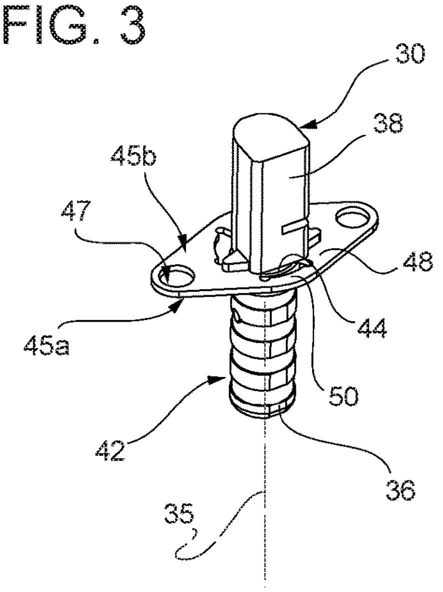
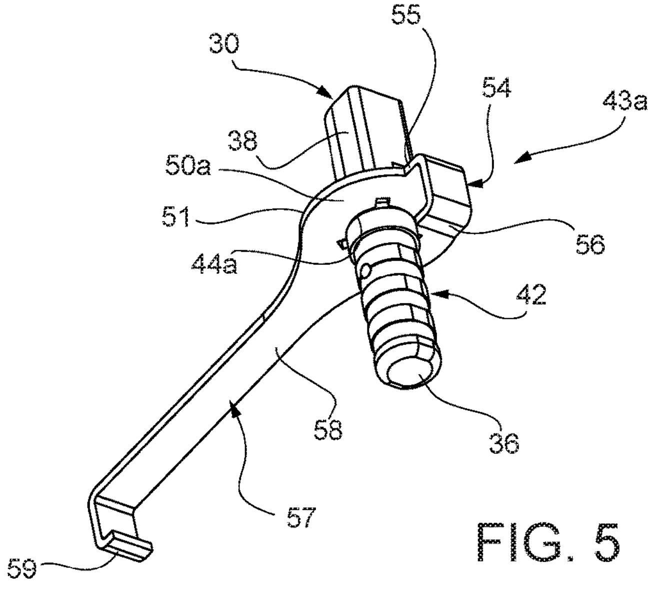
FIG. 5

BRAKING PAD FOR VEHICLES, AND ASSEMBLING METHOD FOR MAKING SUCH A BRAKING PAD

CROSS-REFERENCE TO RELATED APPLICATIONS

This patent application is a U.S. National Phase Application under 35 U.S.C. 371 of International Application No. PCT/IB2023/054187, filed on Apr. 24, 2023, which claims priority from Italian patent application no. 102022000008510 filed on Apr. 28, 2022. The entire disclosures of the above applications are incorporated herein by reference.

TECHNICAL FIELD

This invention relates to a braking pad for vehicles.

BACKGROUND

As is known, a braking pad comprises a metal support plate and a block of friction material, which is carried in a fixed position by the metal plate and has a level of wear that is detected via a sensor, also carried by this plate, to indicate critical wear to the driver of the vehicle.

In particular, in the majority of known solutions, the sensor is fixed via gluing. In any case, the exclusive use of gluing materials to fix the sensor to the metal plate makes the known solutions unsatisfactory.

In particular, the connection made by the gluing materials tends to be sensitive to temperature changes, so that, in many cases, the above-mentioned sensor shifts from its initial assembly position or, even, completely uncouples from the metal plate, thus compromising detection.

Moreover, some types of sensors engage a seat or hole in the block of friction material and are configured so as to detect wear continuously, as the use and consumption of the friction material continues. Some sensors, in addition, are even able to detect the temperature of the friction material, in order to continuously monitor the braking conditions. These types of sensor require an extremely accurate and stable position: in fact, the sensor is mounted on the metal support plate in a predetermined reference position, which must remain constant during operation to be able to provide reliable measuring signals, i.e. with relatively small margins of error, as time passes.

SUMMARY

The purpose of this invention is to provide a braking pad with a sensor coupling system, which resolves the issue described above in a simple and cost-effective manner. In particular, there is a need to adopt a coupling system that enables the sensor to be simply and quickly connected to the metal support plate, as well as its precise and unchanged positioning.

According to this invention, a braking pad, as defined in claim 1, and an assembly process, as claimed in claim 7, are provided. The dependent claims, then, relate to preferred embodiments of this invention.

BRIEF DESCRIPTION OF THE DRAWINGS

The invention will now be described with reference to the attached drawings that illustrate some non-limiting embodiments thereof:

FIG. 1 illustrates a brake calliper for vehicles, provided with braking pads produced according to this invention;

FIG. 3 is a perspective view on an enlarged scale, which shows two components, coupled together, of the solution in FIG. 2;

FIG. 5 is similar to FIG. 3 and shows the corresponding components of the solution in FIG. 4.

DESCRIPTION OF EMBODIMENTS

Figure 2:
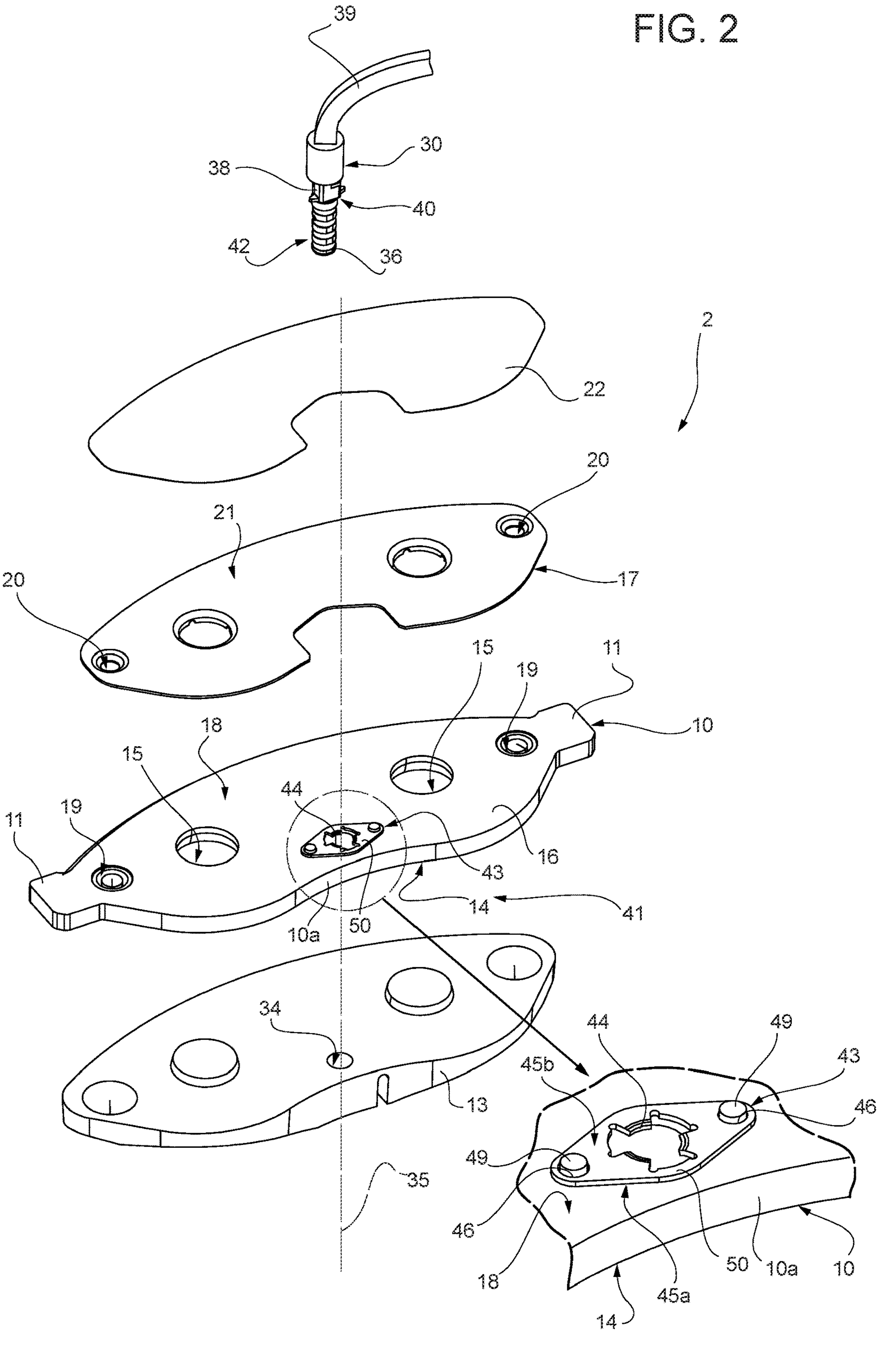
FIG. 2 is an exploded perspective view of a first embodiment of the braking pad according to this invention.

In FIG. 1, the reference number 1 denotes a braking member, in particular a brake calliper, for vehicles.

The calliper 1 is of a known type and, in use, is arranged straddling a brake disc (not illustrated). The calliper 1 supports two braking pads 2 that, in use, are arranged on opposite axial sides of this brake disc and are carried in contact with the latter by driving at least one actuator cylinder 3, for example a hydraulic one. In the specific example illustrated, the calliper 1 comprises a pair of actuator cylinders 3, arranged on one of the sides of the calliper 1.

FIG. 2 shows a first embodiment of the braking pad 2 according to this invention. With reference to what is shown in the exploded view in this figure, the braking pad 2 comprises a support backplate 10, preferably made of metal and coupled to the calliper 1 in a known way not described in detail. In particular, the backplate 10 comprises two end appendages 11, which are opposite each other, that engage corresponding seats (not illustrated) in the calliper 1.

The braking pad 2 comprises, in addition, a block of friction material 13, carried in a fixed position on a face 14 of the backplate 10. In particular, the friction material that forms the block 13 is overmoulded so as to grip the backplate 10, at the face 14 and at least at one hole 15 made through an intermediate portion 16 of the backplate 10.

The braking pad 2 comprises, in addition, a shim 17 that rests on a face 18 of the backplate 10, opposite the face 14, and comprises damping material in order to perform an anti-noise function. The shim 17, for example, is defined by a multi-layered element, formed from alternating layers of metal and elastomer or rubber.

The shim 17 is fixed to the backplate 10, for example by gluing or hot adhesion of the elastomer. Alternatively, or in combination with these coupling methods, the shim 17 may be fixed to the backplate 10 via additional nails or rivets, not illustrated, engaging corresponding pairs of holes 19 and 20 formed in the backplate 10 and in the shim 17.

On the opposite side to the backplate 10, the shim 17 has a face 21 that, preferably, is covered by a covering film 22. In the specific example illustrated, the film 22 covers and, thus, closes the holes 20 (together with the above-mentioned rivets or nails).

The braking pad 2 comprises, in addition, a sensor 30, of a known type not described in detail, having features such that they provide measuring signals that enable the continuous detection of the wear of the block of friction material 13 and, preferably, enable its temperature to be detected too. The backplate 10 and the block 13 have corresponding holes 33 and 34 coaxial to each other along an axis 35 orthogonal to the faces 14, 18, and 21, to receive a detection head 36 defined by an axial end of the sensor 30.

Outside the holes 33 and 34, the sensor 30 ends with a tail portion 38 that is coupled to a wiring 39 to transmit the above-mentioned measuring signals to a known detection system that is not illustrated. The portion 38, in particular, comprises at least one shoulder 40 defining an axial end-of-stroke during the coupling of the sensor 30. For example, the shoulder 40 is defined by at least one radial projection of the portion 38.

The sensor 30 is coupled in a reference position fixed in relation to the backplate 10 via a coupling system 41 that, preferably, includes adhesive materials (not illustrated) to glue a lateral surface 42 of the head 36 to the inner surface of the holes 33 and/or 34.

According to an aspect of this invention, preferably together with the gluing, the coupling system 41 also ensures mechanical retention, obtained via a plate retention member 43, for example made of metal, engaged directly to the backplate 10.

The plate retention member 43 comprises an intermediate portion 50 that is ring-shaped, coaxial to the holes 33 and 34, and has an inner edge 44 coupled to the lateral surface 42 of the head 36 (FIG. 3) via friction and/or interference coupling and/or snap coupling. The edge 44 carries out the function of axial retention after the head 36 has been inserted axially in the holes 33, 34 during the assembly steps, as will be described below. For example, the lateral surface 42 is defined by plastic material that is elastically deformed by the edge 44 during the insertion of the head 36, and this elastic deformation tends to prevent any successive loosening from the same edge 44.

In particular, the edge 44 is formed by radial recesses and retention lugs, alternating with each other in the circumferential direction: only the lugs are coupled to the lateral surface 42 and ensure a certain flexibility to improve sticking and, thus, the retention effect.

The shim 17 and the film 21 preferably have an outline that is shaped so as to be distant from the edge of the hole 33 and to surround the plate retention member 43.

Again with reference to the embodiment in FIG. 2, the plate retention member 43 is preferably a flat element, i.e. it is defined by two faces 45*a* and 45*b* that are flat and parallel. According to a preferred element of this invention, the face 45*a* is resting directly on the face 18.

At the same time, the backplate 10 comprises two pins 46, which project from the face 18, are preferably arranged in diametrically opposite positions to each other in relation to the hole 33, and engage corresponding holes 47 (FIG. 3) made through corresponding lateral lugs 48 of the plate retention member 43.

In the enlarged view in FIG. 2, the ends of the pins 46 are indicated by reference numbers 49 and are plastically deformed, in a way not illustrated, to radially project beyond the edge of the holes 47 and, thus, be engaged to the face 45*b*, in order to retain the plate retention member 43.

The components are assembled after having moulded the friction material to form the block 13 and having made the holes 33 and 34. Specifically, the plate retention member 43 is arranged in a coupling position, resting the face 45*a* on the other face 18. During this operation, the pins 46 are initially undeformed, so they can freely enter the corresponding holes 47. In particular, the height of the pins 46 is greater than that of the holes 47, so that the undeformed ends of the pins 46 project axially beyond the face 45*b* after the positioning of the plate retention member 43 on the face 18.

Subsequently, the ends of the pins 46 are subjected to a plastic deformation operation that enables these ends to be coupled with the face 45*b* and/or with the inner surface of the holes 47 and to lock the plate retention member 43 in the coupling position. This plastic deformation, for example, may be defined by denting for hammering the undeformed ends of the pins 46, or by a cutting operation so as to form a residue of material that projects radially beyond the edge of the holes 47 or is forced against this edge.

After this plastic deformation, then, the deformed ends 49 of the pins 46 define corresponding engagement portions that retain the plate retention member 43 against the face 18 of the backplate 10.

After this engaging step, the sensor 30 is mounted by axially inserting the head 36 in the holes 33, 34, until bringing the shoulder 40 to the end of the stroke, i.e. so it abuts axially against the face 45*b* of the plate retention member 43. After this insertion, the edge 44 is coupled with the lateral surface 42 of the head 36 (FIG. 3) and prevents unwanted, axial withdrawals of that head 36. Finally, the adhesive materials that may be used between the lateral surface 42 of the head 36 and the inner surface of the holes 33 and/or 34 are polymerised to achieve the final fastening of the sensor 30.

Figure 4:
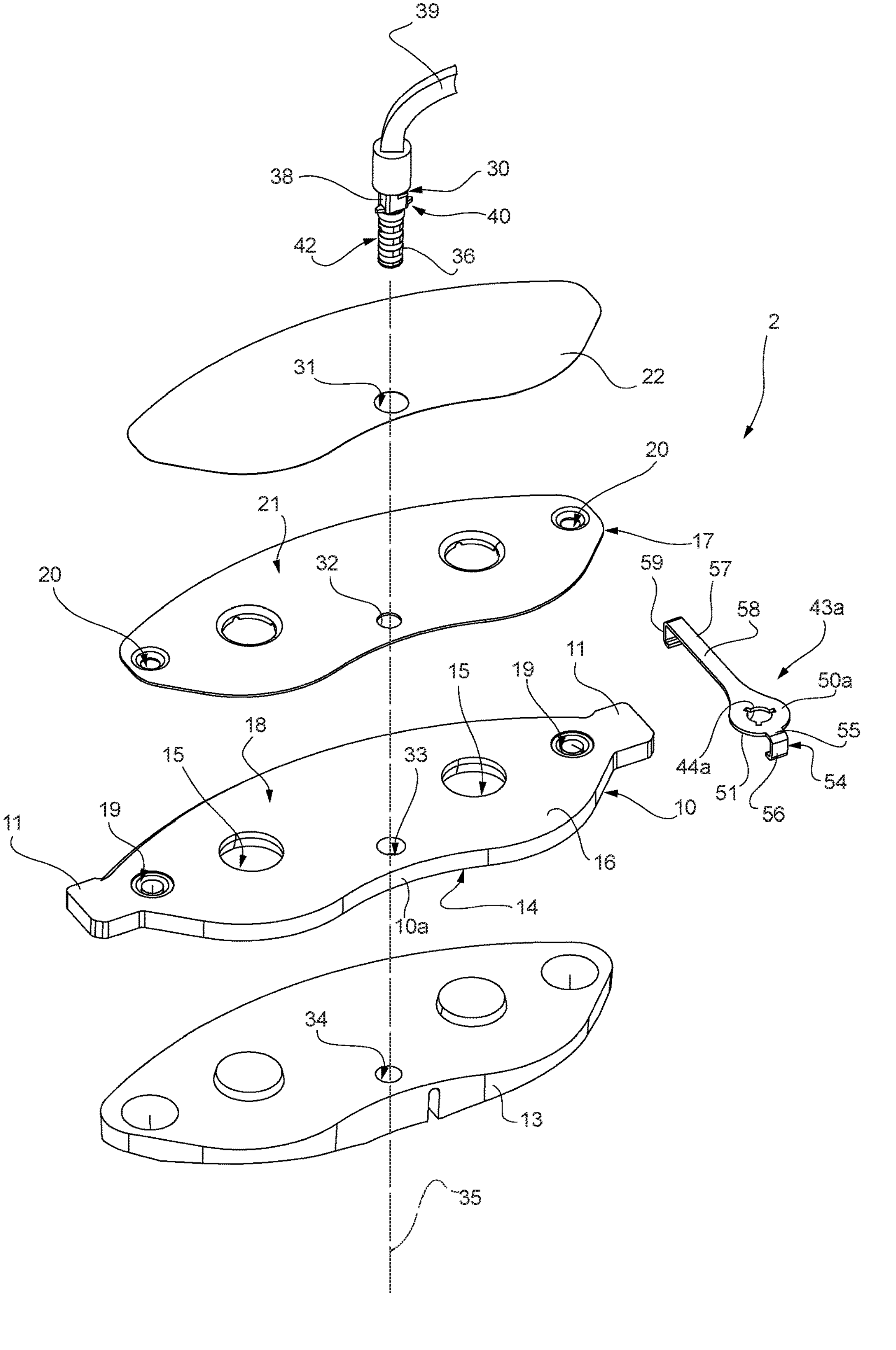
FIG. 4 is similar to FIG. 2 and shows a second embodiment of the braking pad according to this invention, with a detail on an enlarged scale.

With reference to the second embodiment shown in FIGS. 4 and 5, the components shared with the first embodiment were identified, where possible, with the same reference numbers used in FIGS. 2 and 3.

In this solution, the plate retention member is identified by the reference number 43*a* and comprises an intermediate portion 50*a*, which is ring-shaped, having an inner edge 44*a* with the same function as the edge 44 described above.

In particular, the film 22 and the shim 17 have corresponding holes 31 and 32, which are coaxial to the holes 33 and 34 and to the portion 50*a*. The plate retention member 43*a* comprises, in addition, at least two arms 54 and 57 that extend radially starting from an annular outer edge 51 of the intermediate portion 50*a*, and, preferably, are diametrically opposite each other. The arms 54 and 57 comprise corresponding radial portions 55 and 58 that are coplanar with the intermediate portion 50*a* and, together with the latter, rest externally on the film 22. If there is no film 22, the portions 55, 58 and 50*a* rest on the face 21 of the shim 17. If there is no shim 17 either, the portions 55, 58 and 50*a* rest directly on the face 18 of the backplate 10.

In addition, the arms 54 and 57 comprise corresponding engagement portions 56 and 59, which are re-folded in relation to the portions 55 and 58 so as to have a hook shape, so as to be engaged around a lateral edge 10*a* of the backplate 10, which joins the faces 14 and 18 together.

The portions 56 and 59 are directly engaged to the edge 10*a* in positions diametrically opposite each other. This engagement retains the plate retention member 43*a* in a fixed coupling position.

In particular, at least one of the engagement portions 56 and 59 is subjected to a bending operation in relation to the radial portion 55, to assume the above-mentioned hook shape, during the assembly operations, after the plate retention member 43*a* has been rested on the backplate 10, in the coupling position.

The assembly process is basically similar to what was described above for the solution in FIG. 2, so, for brevity's sake, it is not repeated.

From the above, it seems clear that the fact of using the inner edge 44, 44*a* of the plate retention member 43, 43*a* makes it possible to axially retain the head 36 of the sensor 30 engaged with the block 13, potentially to integrate the fastening action already exerted by the adhesive materials, used between the same head 36 and the inner surface of the holes 33 and/or 34.

In this way, you obtain a stable connection, unvarying over time and, above all, not sensitive to thermal variations in the block 13.

Moreover, the fastening operations of the sensor 30 are extremely simple. In fact, they do not require operations in addition to the axial insertion operation that is already included in the known solutions that do not involve the plate retention member 43, 43*a*.

At the same time, the assembly of the plate retention member 43, 43*a* does not have particular complications: in fact, the fastening to the backplate 10 is extremely simple, since it requires a simple plastic deformation operation during the assembly operations.

Lastly, from the above description, it is clear that modifications and variations may be made to the braking pad 2 described herein without departing from the scope of this invention as set forth in the appended claims.

In particular, the number and/or shape and/or position of the arms of the plate retention member 43*a*, like the number and/or shape and/or position of the pins 46, could be different from what is shown, by way of example, in the attached figures.

In addition, as mentioned above, the coupling system 41 could just include the plate retention member 43, 43*a*, without gluing that may be envisaged with the sole function of strengthening the fastening.

The invention claimed is:

1. A braking pad for vehicles, comprising:
- a support backplate suitable for connection to a braking member and having a first and a second face opposite to each other, and a lateral edge between said first and second faces;
- a block of friction material coupled in a fixed position to said first face;
- a sensor comprising a detection head engaging a hole made in said support backplate;
- a coupling assembly configured to retain the detection head in a reference position that is fixed relative to said support backplate, the coupling assembly including:
  - a plate retention element comprising an annular portion having an inner edge that is coaxial to said hole and is coupled to said detection head by friction and/or by interference coupling and/or by snap coupling, the inner edge is defined by a plurality of retention lugs, which are alternated in a circumferential direction with a plurality of radial recesses; and
  - at least one engagement portion, which is part of one of said support backplate and said plate retention element, and is engaged directly to the other of said support backplate and said plate retention element.

2. The braking pad according to claim 1, wherein said coupling assembly comprises two engagement portions.

3. The braking pad according to claim 2, wherein said engagement portions are diametrically opposite to each other with respect to said annular portion.

4. The braking pad according to claim 2, wherein said plate retention element comprises two arms, which extend radially from an outer edge of said annular portion and end, respectively, with said engagement portions; said engagement portions being hook-shaped and being coupled to said lateral edge.

5. The braking pad according to claim 2, wherein said engagement portions are defined by ends of respective pins, which protrude from said second face and engage respective through holes made in said plate retention element.

6. A method for making a braking pad for vehicles, the braking pad including:
- a support backplate suitable for connection to a braking member and having a first and a second face opposite to each other, and a lateral edge between said first and second faces;
- a block of friction material coupled in a fixed position to said first face;
- a sensor comprising a detection head engaging a hole made in said support backplate;
- a coupling assembly configured to retain the detection head in a reference position that is fixed relative to said support backplate, the coupling assembly including:
  - a plate retention element comprising an annular portion having an inner edge that is coaxial to said hole and is coupled to said detection head by friction and/or by interference coupling and/or by snap coupling, the inner edge is defined by a plurality of retention lugs, which are alternated in a circumferential direction with a plurality of radial recesses; and
  - at least one engagement portion, which is part of one of said support backplate and said plate retention element, and is engaged directly to the other of said support backplate and said plate retention element;

wherein the method comprises
- inserting said detection head into said hole, until said reference position is reached; and
- engaging said plate retention element directly to said support backplate, so as to have said inner annular edge in a position coaxial to said hole, before inserting said detection head; during insertion of said detection head, said detection head couples to said inner edge by friction and/or by interference and/or by snap coupling.

7. The method of claim 6, wherein the step of engaging said plate retention element comprises the operations of:
- positioning said plate retention element in a coupling position on said support backplate;
- shaping said engagement portion by plastic deformation after the positioning operation, so as to retain said plate retention element in said coupling position.

8. The method of claim 7, wherein said plastic deformation is carried out by bending an end of an arm, which forms part of said plate retention element and extends radially from an outer edge of said annular portion, so as to engage the bent end to said lateral edge.

9. The method of claim 7, wherein said plastic deformation is carried out on the ends of two pins, protruding from said second face; said pins having been inserted into corresponding holes of said plate retention element during the positioning operation.

10. A braking pad for vehicles, comprising:
- a support backplate suitable for connection to a braking member and having a first and a second face opposite to each other, and a lateral edge between said first and second faces;
- a block of friction material coupled in a fixed position to said first face;
- a sensor comprising a detection head engaging a hole made in said support backplate;
- a coupling assembly configured to retain the detection head in a reference position that is fixed relative to said support backplate, the coupling assembly including:
  - a plate retention element comprising an annular portion having an inner edge that is coaxial to said hole and is coupled to said detection head by friction and/or by interference coupling and/or by snap coupling; and
  - two engagement portions that are part of one of said support backplate and said plate retention element, and are engaged directly to the other of said support backplate and said plate retention element;

wherein said plate retention element includes two arms, which extend radially from an outer edge of said annular portion and end, respectively, with said engagement portions; said engagement portions being hook-shaped and being coupled to said lateral edge.

* * * * *